United States Patent [19]

Ernest et al.

[11] Patent Number: 5,141,912
[45] Date of Patent: Aug. 25, 1992

[54] CHROME/PLATINUM/PALLADIUM CATALYST FOR HYDROCARBON EMISSION CONTROL

[75] Inventors: Michael V. Ernest, Catonsville; Dean A. Denton, Baltimore, both of Md.; Richard A. Carman, Green Bay, Wis.

[73] Assignee: W. R. Grace & Co.-Conn., New York, N.Y.

[21] Appl. No.: 584,545

[22] Filed: Sep. 18, 1990

Related U.S. Application Data

[63] Continuation-in-part of Ser. No. 372.484, Jun. 28, 1989, abandoned.

[51] Int. Cl.$^5$ ............ B01J 23/26; B01J 23/34; B01J 23/40
[52] U.S. Cl. ............ 502/320; 502/313; 502/324; 502/332; 502/333; 502/334; 502/339; 502/439
[58] Field of Search ............ 502/319, 320, 324, 326, 502/327, 333, 334, 339, 332, 439, 527, 314, 313; 423/213.5

[56] References Cited

U.S. PATENT DOCUMENTS

| | | | |
|---|---|---|---|
| 3,314,159 | 4/1967 | Betz | 34/72 |
| 3,725,532 | 4/1973 | Fernandes et al. | 423/245 |
| 3,787,333 | 1/1974 | Ichihara et al. | 502/314 |
| 3,873,469 | 3/1975 | Foster et al. | 502/527 |
| 3,873,471 | 3/1975 | Koberstein et al. | 502/320 |
| 3,983,072 | 9/1976 | Stephens | 502/324 |
| 4,280,898 | 7/1981 | Tatterson et al. | 502/517 |
| 4,343,096 | 8/1982 | Bergland | 34/47 |
| 4,343,769 | 8/1982 | Henkelman | 422/109 |
| 4,390,456 | 6/1983 | Sanchez et al. | 423/628 |
| 4,465,654 | 8/1984 | Faschnigbauer | 423/213.5 |
| 4,492,769 | 1/1985 | Blanchard et al. | 502/262 |
| 4,528,170 | 7/1985 | Meier zu Koecker et al. | 423/245 |
| 4,572,904 | 2/1986 | Onal | 502/333 |
| 4,673,663 | 6/1987 | Magnier | 502/320 |
| 4,729,977 | 3/1988 | Immel et al. | 502/170 |
| 4,780,300 | 10/1988 | Yokoyama et al. | 502/345 |
| 4,797,380 | 1/1989 | Motoo et al. | 502/527 |

*Primary Examiner*—Anthony McFarlane
*Attorney, Agent, or Firm*—Edward J. Cabic

[57] ABSTRACT

A catalyst for control of hydrocarbon emission with improved resistance to phosphorus, sulfur, halogen and silicon poisoning comprising a refractory oxide support impregnated with 0.5 to 20% by weight chromium oxide or manganese oxide or a mixture thereof, and a catalytically effective amount of one or more platinum group metals. The preferred refractory oxide support is alumina. The preferred platinum group metals include Pt, Pd, Ir and Rh.

16 Claims, No Drawings

CHROME/PLATINUM/PALLADIUM CATALYST FOR HYDROCARBON EMISSION CONTROL

This is a continuation in part of application Ser. No. 372,484, filed Jun. 28, 2989, now abandoned.

FIELD OF THE INVENTION

This invention relates to catalysts, and more specifically to a catalyst for control of hydrocarbon emissions comprising chromium or manganese, or a combination thereof, together with one or more platinum group metals.

DESCRIPTION OF THE PRIOR ART

Control of hydrocarbon emissions such as from printing equipment is becoming more widespread with the concerns over workplace health as well as environmental concerns. Both catalytic and non-catalytic systems are currently in place, and each has its own particular benefits. Catalytic control is a very efficient approach for cleaning up the hydrocarbon emissions from the use of hydrocarbon solvent based inks. The search for catalytic compositions which are durable and maintain their ability to catalytically oxidize those hydrocarbons continues. Catalytic poisoning is probably the most frequent cause of shortened life span of such catalysts. Phosphorus poisoning in particular is known to accelerate the deactivation of the catalyst. Other contaminants such as halogens, sulfur and silicon also have a detrimental effect on the catalyst's life. Hence, this has lead to the design of a catalyst that can retain greater levels of activity at increased levels of phosphorus as well as other contaminants.

The typical catalyst in use in the current systems is not too different from those in current auto exhaust catalysts. The catalytic substrate is very similar, although the catalytic composition is decidedly low technology (like the first generation auto exhaust catalysts) as exhaust (composition, temperatures, poisons, from printing equipment is much better controlled and less variable than those from typical engine exhaust. Because of this, the current catalysts have been simple in design as well as less costly compared to the average auto exhaust catalyst. Analogously to the development of "High Tech" auto exhaust catalysts which have improved durability, this current invention relates to the development of "High Tech" catalysts for controlling hydrocarbon emissions from printing equipment and other similar applications. The current catalysts are typically platinum group metals supported on transition alumina beads. The catalyst of this invention involves the incorporation of either chromium oxide or manganese oxide or a combination of both onto a refractory oxide support (such as alumina, zirconia, silica-alumina) followed by one or more platinum group metals. This catalytic composition exhibits improved performance (higher conversions of hydrocarbons at comparable levels of phosphorus contamination) compared to conventional catalysts.

SUMMARY OF THE INVENTION

An object of this invention is to provide a catalyst for removal of hydrocarbons with improved hydrocarbon conversion efficiencies.

Another object of this invention is to provide a hydrocarbon removal catalyst with improved resistance to phosphorous, sulfur, halogen and silicon poisoning.

Another object of this invention is to provide a method of preparing catalysts for use in the control of hydrocarbons.

Yet another object of this invention is to provide a method of controlling hydrocarbon emissions by catalytic oxidation at temperatures in the range 180° to 650° C.

In accordance with the present invention, there have been provided certain novel catalysts useful for removing hydrocarbons comprising chromium oxide or manganese oxide or a combination of both on a refractory oxide support together with one or more platinum group metals.

DETAILED DESCRIPTION

The present invention is directed to a catalyst with improved hydrocarbon conversions and greater resistance to phosphorous, sulfur, halogen and silicon poisoning. The catalysts of this invention are formed by depositing onto a refractory oxide support about 0.5 to 20% by weight of a base metal oxide component, and a catalytically effective amount of one or more platinum group metals.

Suitable refractory oxide supports for use in this invention include, but are not limited to alumina, zirconia, silica-alumina, and the like, and is preferably alumina. When the support is alumina, it is in a transition form. The transition forms are chi, gamma, eta, delta, theta, iota and kappa. The preferred forms are gamma, eta, delta and theta. In general, the aluminum oxide will have to be heated to at least 300° C. to be in the transition form. The preferred B.E.T. surface area for the supports is from 50 to 250 $m^2/g$ which comes from pores substantially in the 100-1000 Angstrom units region. Such high surface area supports are characterized as being porous. The supports can be either in the form of powders or particles. For the powdered form, where the application will be as a washcoat on a monolithic catalyst, the preferred average particle size of the powder is 100 microns or less. When forming a monolithic catalyst, the weight percentages for the various additives are based on the weight of the washcoat mixture and not upon the weight of the inert support monolith.

The particle forms include spheres, beads, pellets, tablets or extrusions. For the particle form, the preferred size is between 4 to 10 mesh.

Suitable base metal oxide components for use in this invention include chromium oxide, manganese oxide, and mixtures thereof. Suitable platinum group metals for use in this invention include Pt, Pd, Ir, Rh, and mixtures thereof. The platinum group metals are typically present in an amount of about 100 ppm to 10,000 ppm, based on the weight of the catalyst, and preferably from about 200 ppm to 2000 ppm.

The catalysts of this invention are prepared by impregnating the refractory oxide support with a solution containing a salt of the base metal components. The base metal impregnated support is optionally dried at 100°–200° C. and then heated to a temperature sufficient to decompose the salt of the base metal component so as to obtain the oxide of the base metal component. In a preferred embodiment, the heating is done at a temperature from about 400° to 1100° C. The heating temperature is dependent upon the particular precursor used to form the transition alumina. For example, alumina made from boehmite is preferably heated at a temperature from about 400° to 700° C, whereas alumina made from pseudoboehmite is preferably heated from about 800°–1100° C. Those skilled in the art are intimately familiar with these heating conditions and will be readily able to determine suitable heating conditions for the particular refractory oxide support used.

Next, one or more platinum group metals are impregnated onto the base metal oxide impregnated support using a solution of salts of the platinum group metals. After impregnation, the impregnated material is then dried and activated at a temperature of about 100° to 600° C. Activation can be by calcination in air, reductive calcination in hydrogen or a hydrogen-nitrogen mixture, calcination in a mixture of steam-hydrogen or a steam-hydrogen-nitrogen mixture, or other equivalent methods well known to those skilled in the art.

Without further elaboration, it is believed that one skilled in the art, using the preceding detailed description can utilize the present invention to its fullest extent.

The following examples are provided to illustrate the invention in accordance with the principles of this invention, but are not to be construed as limiting the invention in any way except as indicated in the appended claims. All parts and percentages are by weight unless otherwise indicated.

EXAMPLE 1

This examples illustrates the composition and preparational procedure used for the catalyst of the invention. Alumina beads as manufactured according to U.S. Pat. No. 4,390,456 were used in the preparation of this catalyst. These beads have very few micropores below 100 Angstrom units and they have a compacted bulk density of from 20–36 lbs./ft.$^3$. An 8800 gram quantity of such beads which had been activated at 1038° C. had a moisture content measured by Ohaus moisture balance) and a water pore volume of 0.85 cc/g. The alumina beads were impregnated with a solution prepared by dissolving chromic anhydride ($CrO_3$) in a total of 6950 milliliters of deionized water. The impregnation was carried out using atomizing spray nozzles. The catalyst was then dried and activated at 538° C. for 2 hours. 8497 grams of the above base was impregnated with a mixed solution of platinum and palladium sulfito complexes applied at 95% of the incipient wetness level. The solution was prepared by combining 29.30 grams of hexammonium platinum tetrasulfite solution (having a platinum concentration of 9.898%) with in situ prepared palladium sulfito complex. The latter was prepared by adding 12.8 grams of palladium nitrate solution (having a palladium concentration of 8.671%) to a dilute sulfurous acid solution (50 milliliters of sulfurous acid having a sulfur dioxide content of 6% by weight diluted to 5 liters with deionized water). Once the platinum and palladium solutions were combined, the mixed solution was finally diluted to 7100 milliliters. It was sprayed on the chrome containing support through atomizing nozzles. The total spray time was approximately 10 minutes. The impregnated material was placed in a furnace and heated to 538° C. for 2 hours. The finished catalyst had the following properties.

| Property | |
|---|---|
| Compacted bulk density | 0.493 g/cc |
| Average crush strength | 2.04 kg |
| B.E.T. surface area | 140 m$^2$/g |
| Screen Analysis (U.S.) | |
| +5 mesh | 0.0% |
| −5+6 mesh | 0.3 |
| −6+7 mesh | 56.9 |
| -continued | |
| −7+8 mesh | 41.2 |
| −8+10 mesh | 1.4 |
| −10 mesh | 0.1 |
| Composition | |
| % Cr as $Cr_2O_3$ | 3.7% |
| ppm Pt | 327 |
| ppm Pd | 129 |

EXAMPLE 2

To illustrate the superiority of the catalysts of this invention over the prior art catalysts, a sample was prepared which contained no chromium oxide or manganese oxide. The alumina beads as described in Example 1 were activated at sufficient time and temperature conditions to achieve a B.E.T. surface area of 280 m$^2$/g. The platinum group metal impregnation procedure was the same as described in Example 1. A hexammonium platinum tetrasulfite complex solution was combined with in situ palladium sulfito complex solution. The palladium solution was prepared by reacting palladium nitrate with sulfurous acid, 4.5 millimoles sulfur dioxide per gram atom palladium. This solution was then combined with the platinum solution and finally diluted to approximately the volume required to reach 90–95% incipient wetness. The alumina beads were impregnated by spraying the solution through atomizing nozzles, after which the catalyst was transported through dryers. The catalyst was then activated in a rotary calciner at approximately 343° C. with an air flow over a moving bed. The catalyst had a nominal platinum loading of 327 ppm and a nominal palladium loading of 127 ppm. This example will constitute Catalyst 2.

EXAMPLE 3

This example identifies Catalyst 3, which was prepared identically to Catalyst 2 above except that the noble metals were formulated to be double those of Catalyst 2. Analysis showed Catalyst 3 to contain 660 ppm platinum and 264 ppm palladium.

EXAMPLE 4

This example identifies Catalyst 4, which was prepared identically to Catalyst 2 above except that the noble metals were formulated to be triple those of Catalyst 3. Analysis showed Catalyst 4 to contain 1010 ppm platinum and 394 ppm palladium.

EXAMPLE 5

Examples 1–4 all contained platinum and palladium. To illustrate that the addition of chromium oxide is equally effective in the presence of a single noble metal, the following is a description of such a catalyst. A catalyst consisting of only platinum as the platinum group metal was prepared on a chromium oxide containing alumina bead support. That bead support was prepared by impregnating chromium (III) nitrate solution onto alumina beads, drying, and calcining to result in 5% chromium oxide. The platinum was applied via spraying $(NH_4)_6Pt(SO_3)_4$ solution through atomizing nozzles. The catalyst was then dried and activated in air. This was identified as Catalyst 5. Nominal platinum concentration was 327 ppm.

EXAMPLE 6

In order to make a fair comparison with the catalyst in Example 5, a non-chromia containing catalyst was prepared with the same nominal loading of platinum (viz., 327 ppm). It was then prepared similarly to the catalyst as described in Example 2 with the exception that only one impregnation was required to apply the platinum. Activation procedure paralleled that of Example 2. This was identified as Catalyst 6.

EXAMPLE 7

A laboratory bench scale test is the means by which improvements in catalytic performance and durability are assessed. The apparatus consists of tubular reactor having a 2.5 cm I.D., which contains 8.5 cubic centimeters of catalyst through which a flow of 2.8 liters per minute of a synthetic gas mixture flows. The test gas consists of 200 ppm of hexane in air, which is typical of hydrocarbon concentrations coming from commercial graphic art dryers. The test begins when the temperature is raised to 399° C. and the catalyst is allowed to reach an equilibrium level of conversion. The temperature is then lowered to 371° C. and 343° C., at which points the conversions are determined. Both fresh and aged catalysts were tested using this method.

EXAMPLE 8

Because phosphorus poisoning is one of the major causes of decrease in catalyst performance with time on stream, a method was devised to evaluate potential catalyst formulations without the need to do expensive full-scale testing. Test "plugs" of catalyst are inserted into the existing catalytic pollution control devices used on various commercial size printing equipment. These field studies provide the catalyst "plugs" with actual exposure time, temperature, and gas flows under which a catalyst might be expected to perform. The "plugs" of catalyst are 90 millimeters in height and 44.5 millimeters in diameter. Multiple "plugs" of each of the catalysts 1-6 were included such that at the end of selected time intervals samples could be taken. The temperature during aging of the catalyst samples was maintained at 354° C. The amount of phosphorus accumulation on the catalysts averaged approximately 0.3 weight percent per month. Samples were taken after 2 and 4 months of aging. The aged catalysts were carefully separated into layers of 3.2 millimeters in depth so that phosphorus content and activity could be determined as a function of bed depth. The activities of Catalysts 1-4 were determined as a function of temperature and aging time for composites of the first 13 millimeters of catalyst exposed to the incoming gas stream. The results are summarized in Table I. The data show the catalyst of this invention to be not only more active when fresh, but also more durable than those catalysts which do not contain chromium and which contained up to three times the amount of noble metals.

Only fresh data were available on Catalysts 5 and 6. Nevertheless, the beneficial effect of adding the chromium is clearly apparent in Table II.

TABLE I

| | Conversions as a Function of Aging Time and Phosphorous Level | | | | |
|---|---|---|---|---|---|
| | Age | Percent | Test Temperature. °C. | | |
| Example | (months) | P | 399 | 371 | 343 |
| 1 | Fresh | 0.0 | 99.1 | 99.0 | 99.8 |
| | 2 | 0.8 | 99.1 | 98.3 | 93.7 |
| | 4 | 1.7 | 99.1 | 98.7 | 91.4 |
| 2 | Fresh | 0.0 | 98.1 | 97.4 | 94.8 |
| | 2 | 1.4 | 90.9 | 84.6 | 72.4 |
| | 4 | 1.8 | 86.1 | 76.3 | 58.6 |

TABLE I-continued

| | Conversions as a Function of Aging Time and Phosphorous Level | | | | |
|---|---|---|---|---|---|
| | Age | Percent | Test Temperature. °C. | | |
| Example | (months) | P | 399 | 371 | 343 |
| 3 | Fresh | 0.0 | 98.3 | 97.9 | 96.3 |
| | 2 | 1.3 | 95.3 | 94.3 | 90.3 |
| | 4 | 2.1 | 93.5 | 92.1 | 87.0 |
| 4 | Fresh | 0.0 | 98.2 | 97.7 | 96.2 |
| | 2 | 1.2 | 95.6 | 95.2 | 93.0 |
| | 4 | 2.0 | 94.6 | 93.6 | 89.9 |

TABLE II

| Fresh Conversions (With and Without Chromium) | | | |
|---|---|---|---|
| | Test Temperature. °C. | | |
| Catalyst | 399 | 371 | 343 |
| 5 | 99.6 | 99.7 | 96.0 |
| 6 | 95.5 | 92.0 | 82.9 |

What is claimed is:

1. A catalyst for the control of hydrocarbon emissions in the presence of phosphorous, sulfur, halogen and silicon containing poison species comprising
   (a) a porous refractory oxide support having a B.E.T. surface area of 50-250 m$^2$/g which is present in pores having diameters substantially in the range of 100-1000 Angstrom units, a compacted bulk density of from 20-36 lbs./ft.$^3$ and having deposited thereon by impregnation about 0.5-20% by weight of a base metal oxide selected from the group of chromium oxide, manganese oxide, or a mixture thereof, and
   (b) a catalytically effective amount of one or more platinum group metals selected from the group of Pt, Pd, Ir, Rh, or mixtures thereof, wherein said catalyst resists poisoning by phosphorous, sulfur, halogen and silicon containing position species.

2. A catalyst according to claim 1 wherein the refractory oxide support is selected from the group of alumina, zirconia and silica-alumina.

3. A catalyst according to claim 1 wherein the base metal oxide is present in an amount from about 2-6% by weight.

4. A catalyst according to claim 1 wherein the platinum group metals are present in an amount from about 100 ppm-10,000 ppm by weight.

5. A catalyst according to claim 1 wherein the platinum group metals are present in an amount from about 200 ppm-2,000 ppm by weight.

6. A catalyst according to claim 1 wherein the refractory oxide support is selected from the group consisting of a powder, bead, pellet, tablet or extrudate.

7. A catalyst according to claim 1 wherein the refractory oxide support is a powder and is used as a washcoat for a monolith.

8. A catalyst according to claim 1 wherein the refractory oxide support is in the form of a sphere.

9. A method of making a catalyst for controlling hydrocarbon emissions comprising the steps of
   (a) impregnating a refractory oxide support having a B.E.T. surface area of 50-250 m$^2$/g which is present in pores having diameters substantially in the range of 1100-1000 Angstrom units and a compacted bulk density of from 20-36 lbs./ft.$^3$ with a solution containing salts of a base metal selected from the group of chromium, manganese, or mixtures thereof;

(b) heating the impregnated support to a temperature sufficient to dry and decompose the base metal salt to obtain a base metal oxide;

(c) impregnating the base metal oxide impregnated support from step (b) with solutions containing one or more platinum group metals selected from the group of Pt, Pd, Ir, Rh, or mixtures thereof;

(d) activating the catalyst.

10. A method of making a catalyst according to claim 9 wherein the refractory oxide support is selected from the group of alumina, zirconia, and silica alumina.

11. A method of making a catalyst according to claim 9 wherein the base metal oxide is present in an amount from 2 to 6% by weight.

12. A method of making a catalyst according to claim 9 herein the platinum group metals are present in an amount from about 100 ppm to 10,000 ppm by weight.

13. A method of making a catalyst according to claim 9 wherein the refractory oxide support is selected from the group consisting of a powder, bead, pellet, tables or extrudate.

14. A method of making a catalyst according to claim 9 wherein the refractory oxide support is a powder and is used in a washcoat for a monolith.

15. A method of making a catalyst according to claim 9 wherein the platinum group metals are present in an amount from about 200 ppm to 2,000 ppm by weight.

16. A method of making a catalyst according to claim 9 wherein the refractory oxide support is in the form of a sphere.

* * * * *

UNITED STATES PATENT AND TRADEMARK OFFICE
CERTIFICATE OF CORRECTION

PATENT NO. : 5,141,912
DATED      : August 25, 1992
INVENTOR(S) : Ernest et al

It is certified that error appears in the above-identified patent and that said Letters Patent is hereby corrected as shown below:

Col. 6:
Claim 1, Line 17, change "position" to "poison".
Col. 7:
Claim 9, line 6, change "1100-1000" to "100-1000".
Col. 8:
Claim 12, line 2, change "herein" to "wherein".
Col. 8:
Claim 13, line 3, change "tables" to "tablet".

Signed and Sealed this

Seventh Day of September, 1993

Attest:

BRUCE LEHMAN

*Attesting Officer*           *Commissioner of Patents and Trademarks*